United States Patent
Takahashi (10) Patent No.: US 8,517,388 B2
(45) Date of Patent: Aug. 27, 2013

(54) BELLOWS TYPE MECHANICAL SEAL

(75) Inventor: Hidekazu Takahashi, Minato-Ku (JP)

(73) Assignee: Eagle Industry Co., Ltd., Minato-Ku (JP)

( * ) Notice: Subject to any disclaimer, the term of this patent is extended or adjusted under 35 U.S.C. 154(b) by 26 days.

(21) Appl. No.: 13/258,793

(22) PCT Filed: Mar. 30, 2010

(86) PCT No.: PCT/JP2010/055662
§ 371 (c)(1),
(2), (4) Date: Sep. 22, 2011

(87) PCT Pub. No.: WO2010/113932
PCT Pub. Date: Oct. 7, 2010

(65) Prior Publication Data
US 2012/0013076 A1    Jan. 19, 2012

(30) Foreign Application Priority Data
Mar. 31, 2009    (JP) .................. 2009-086856

(51) Int. Cl.
*F16J 15/38*    (2006.01)
*F16J 15/34*    (2006.01)

(52) U.S. Cl.
USPC ........... 277/391; 277/370; 277/372; 277/373; 277/397

(58) Field of Classification Search
CPC ..... F16J 15/363; F16J 15/3464; F16J 15/348; F16J 15/38
USPC .......................... 277/391, 370, 372, 373, 397
See application file for complete search history.

(56) References Cited

U.S. PATENT DOCUMENTS

| | | | | |
|---|---|---|---|---|
| 2,247,505 A | * | 7/1941 | Kohler | 277/400 |
| 3,515,394 A | * | 6/1970 | Stevens | 277/391 |
| 4,175,753 A | * | 11/1979 | Wentworth, Jr. | 277/396 |
| 5,941,531 A | * | 8/1999 | Parker et al. | 277/369 |
| 6,688,601 B2 | * | 2/2004 | Takahashi | 277/358 |
| 7,819,405 B2 | * | 10/2010 | Ohama et al. | 277/370 |

FOREIGN PATENT DOCUMENTS
JP    07-025368 U    5/1995

OTHER PUBLICATIONS

Hidekazu Takahashi, "*High-Temperature Bellows Seal Having Breakage-Prevention Mechanism*," (with partial translation), Industrial Machinery No. 682, Jul. 2007, The Japan Society of Industrial Machinery Manufacturers, Jul. 20, 2007, pp. 38-40.

\* cited by examiner

*Primary Examiner* — Vishal Patel
*Assistant Examiner* — Nathan Cumar
(74) *Attorney, Agent, or Firm* — Burr & Brown (57) ABSTRACT

A bellows type mechanical seal is provided that is capable of reducing adverse effects on the bellows. The bellows type mechanical seal includes a first annular member fixed on a rotary shaft, a second annular member resiliently supported by the bellows in a housing axially to the outside of the first annular member, a seal ring having a first end seal face contacting the first annular member and a second end seal face contacting the second annular member, both seal faces being perpendicular to the shaft. A centering member is arranged contacting the inner surface of the seal ring and the inner surface of the second annular member within an annular space formed between both of the inner surfaces and the shaft to keep the sealing ring and the second annular member in alignment with each other.

9 Claims, 8 Drawing Sheets

BELLOWS TYPE MECHANICAL SEAL

FIELD OF THE INVENTION

The present invention relates to a bellows type mechanical seal.

BACKGROUND OF THE INVENTION

A mechanical seal with bellows is known as a shaft seal device of a pump that handles fluid of high temperature over 200° C. and containing great amount of solid content such as asphalt, tar, pitch, and the like in petroleum refinery, petrochemical plant, iron making chemical plant, and the like (see non-patent document 1).

Figure 6:
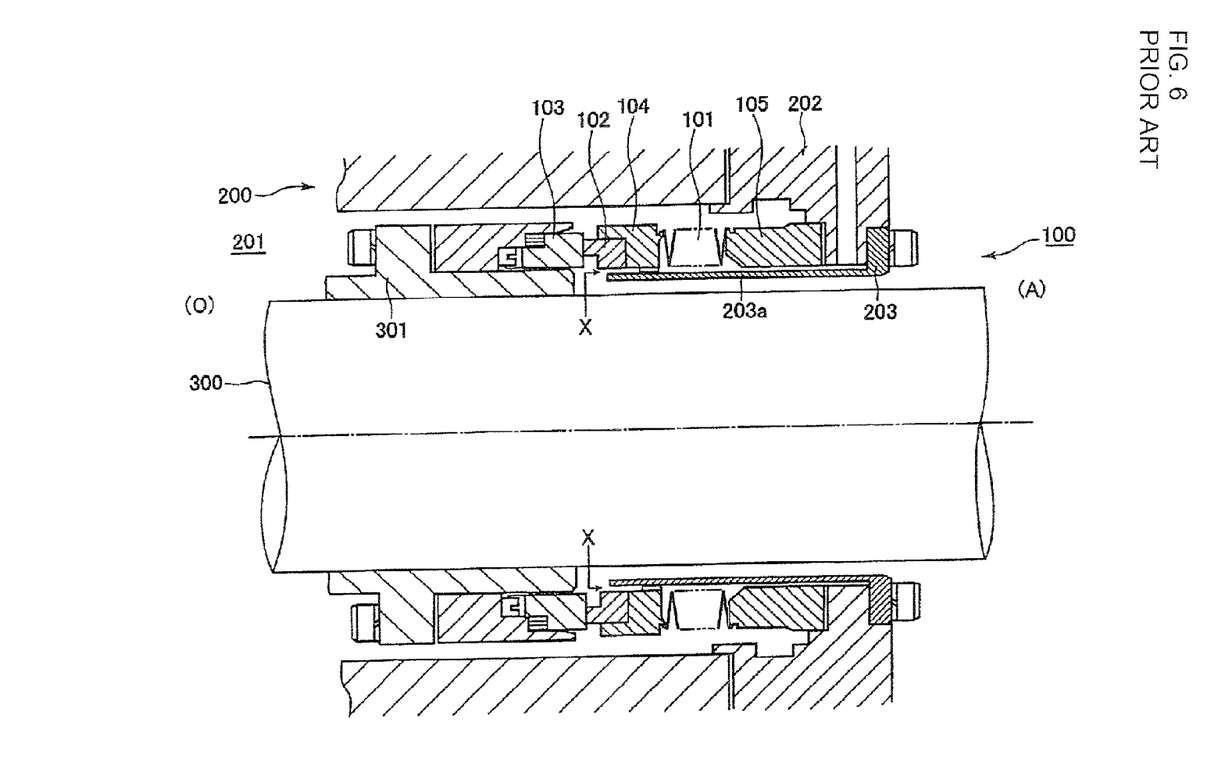
FIG. 6 is a schematic cross-sectional view describing the configuration of a bellows type mechanical seal according to a conventional example.
Figure 7:
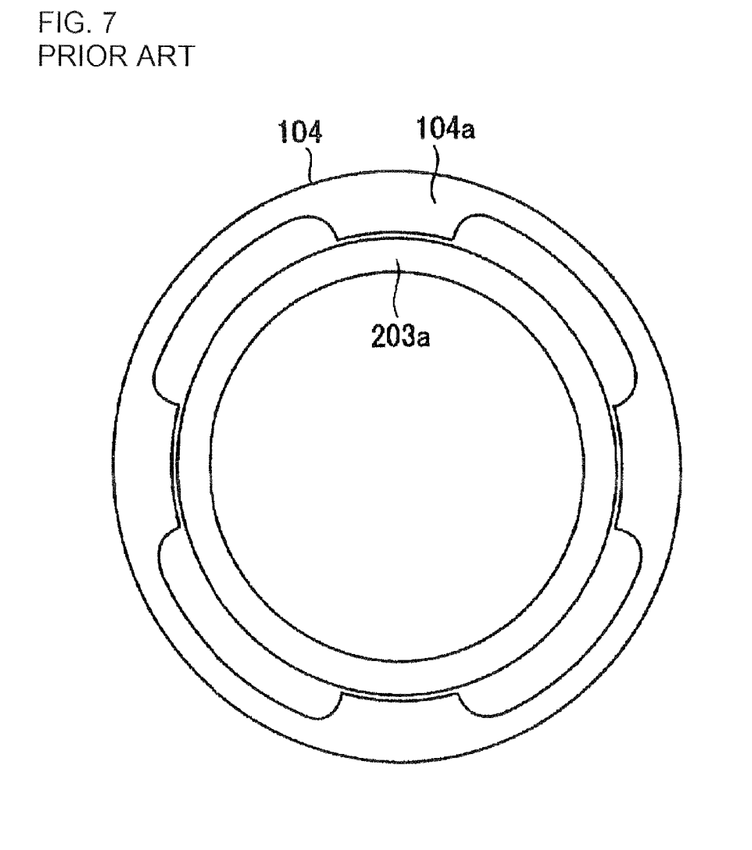
FIG. 7 is a view seen from X of FIG. 6.
Figure 8:
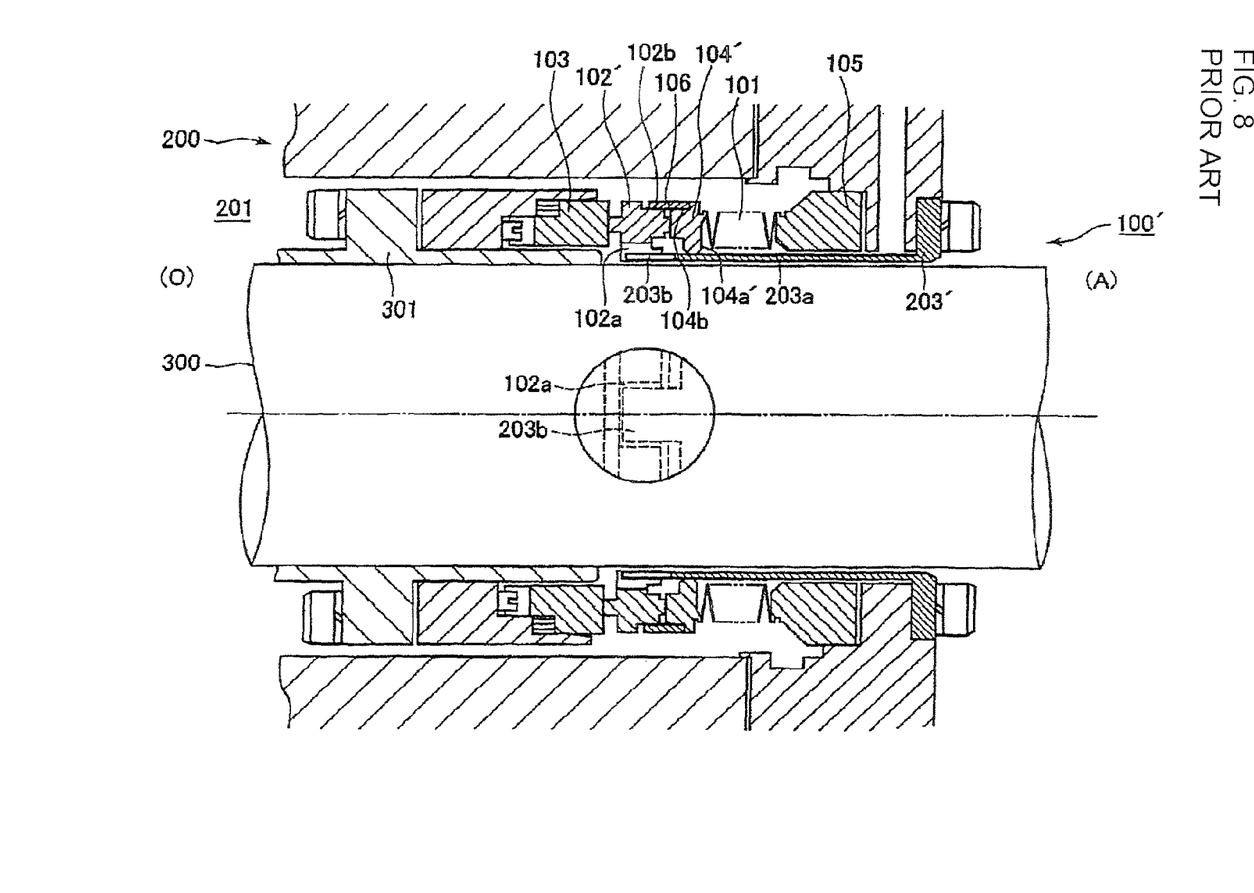
FIG. 8 is a schematic cross-sectional view describing the configuration of the bellows type mechanical seal according to another conventional example.

The bellows type mechanical seal will be described with reference to FIG. 6 to FIG. 8. FIG. 6 is a schematic cross-sectional view describing the configuration of the bellows type mechanical seal according to the conventional example. FIG. 7 is a view seen from X of FIG. 6. FIG. 8 is a schematic cross-sectional view describing the configuration of the bellows type mechanical seal according to another conventional example.

A mechanical seal 100 shown in FIG. 6 has a configuration in which a seal ring 102, which is resiliently supported by a housing 200 through a retainer 104, a bellows 101, a collar 105, a seal cover 202, and the like, and a mating ring 103 fixed to a rotating shaft 300 contact in a freely slidable manner with each other to seal an annular space between the housing 200 and the rotating shaft 300.

The seal ring 102 is burn fitted or press fitted to the retainer 104 welded to one end of the bellows 101. The collar 105 is welded to the other end of the bellows 101. The collar 105 is fixed to the seal cover 202 attached to an opening of a shaft hole 201 of the housing 200. The mating ring 103 is fixed to a sleeve 301 fixed to an outer circumferential surface of the rotating shaft 300.

The seal ring 102 and the mating ring 103 are arranged axially lined so that the end faces of the seal ring and the mating ring perpendicular to the shaft contact with each other, and are configured to slidably move in the circumferential direction to each other where when the rotating shaft 300 rotates with respect to the housing 200. The seal ring 102 has higher follow-up property with respect to the mating ring 103 as the bellows 101 resiliently receive the slidable movement torque generated by the slidable movement with the mating ring 103.

A baffle sleeve 203 for guiding the quench fluid such as steam to the end sealing face, cleaning the oozed and leaked solution from the end sealing face, and cooling and lubrication of the end sealing face is also arranged. The baffle sleeve 203 is attached to the seal cover 202, and includes a cylindrical portion 203a extending axially on the inner diameter side of the seal ring 102 and the mating ring 103.

As shown in FIG. 7, a damper 109a configured by a plurality of projections projecting out in the inner diameter direction is arranged on the inner peripheral surface of the retainer 104. The damper 104a is projected out so as to partially narrow the space between the inner peripheral surface of the retainer 104 and the outer peripheral surface of the cylindrical portion 203a of the baffle sleeve 203 in a range the axial movement of the retainer 104 is not inhibited. The movement in the direction perpendicular to the shaft in the retainer 104 is thereby regulated, the occurrence of circumferential microscopic vibration (stick slip) of high cycle at the end sealing face due to lack of lubricant at the end sealing face and the like is suppressed, and the breakage of the welded portion of the bellows 101 by the vibration is prevented.

However, in the configuration in which the seal ring 102 is burn fitted or press fitted to the retainer 104 so as to be integrated, lowering of sealability, damage due to local contact at the end sealing face etc. occur from the influence of the difference in coefficients of thermal expansion of the bellows 101, the seal ring 102, and the retainer 104 at the time of high temperature use.

In the mechanical seal 100' shown in FIG. 8, the seal ring 102' is not fixed to the retainer 104', and they are contacted at the lapped (surface polished) surfaces. Thus, the influence of the difference in coefficients of thermal expansion can be reduced, the sealability can be maintained even at the time of high temperature use, and damages due to the influence of heat deformation and the like can be suppressed. Furthermore, special steps such as burn fitting and press fitting, and the subsequent heat processing and the like are unnecessary, so that the manufacturing cost can be reduced.

In such mechanical seal 100', a projection 203b arranged at the distal end of the cylindrical portion 203a of the baffle sleeve 203' is loosely engaged to the cutout 102a formed on the inner peripheral surface of the seal ring 102', so that the baffle sleeve 203' clutches the seal ring 102'. The slidable movement torque thus is prevented from being transmitted to the bellows 101.

A damper 104a' or a plurality of projections projecting in the inner diameter direction is arranged on the inner peripheral surface of the retainer 104'. The damper 104a' is projected out in the inner diameter direction so as to partially narrow the space between the retainer 104' and the cylindrical portion 203a of the baffle sleeve 203' in a plurality of areas on the inner peripheral surface of the retainer 104' to regulate the movement of the retainer 104' in the direction perpendicular to the shaft and suppress the oscillation of the bellows 11, similar to the damper 104a of the mechanical seal 100 shown in FIG. 6.

Furthermore, an annular recess is formed by a step difference portion 102b and a stepped portion 104b for partially reducing the outer diameter is formed at the outer peripheral surface of the seal ring 102' and the outer peripheral surface of the retainer 104', and a centering case 106 for centering the seal ring 102' and the retainer 104' is attached to the recess.

However, since the centering case 106 is fitted with a very small gap in view of the change in dimension by thermal expansion, the vibration is transmitted to the bellows 101 when fluid such as tar and pitch enters the space and is fixed thereat, thereby damaging the bellows 101.

PRIOR ART DOCUMENT

Non-Patent Document

Non-patent document 1: Hidekazu Takahashi, "High temperature bellows seal with breakage prevention mechanism", "Industrial machinery No. 682 July 2007", The Japan Society of Industrial Machinery Manufacturers, Jul. 20, 2007, p. 38-40.

SUMMARY OF THE INVENTION

In view of solving the problems of the prior art, it is an object of the present invention to provide a bellows type mechanical seal capable of reducing the influence of vibration on the bellows.

Means for Solving the Problems

In order to achieve the above object, according to the present invention, there is provided a bellows type mechanical seal for sealing an annular space between a shaft hole formed in a housing and a rotating shaft inserted to the shaft hole, including a first annular member fixed to the rotating shaft, a second annular member resiliently supported with respect to the housing through a bellows at a position on an opening side of the shaft hole closer than the first annular member, and a seal ring having a first end sealing face contacting the first annular member in a freely slidable manner and a second end sealing face contacting the second annular member, both sealing faces being perpendicular to the axis line, wherein a centering member is arranged contacting an inner peripheral surface of the seal ring and an inner peripheral surface of the second annular member facing a non-sealed region in the annular space to keep shaft centers of the seal ring and the second annular member in alignment with each other.

According to the present invention, the propagation of vibration to the bellows due to the fixation of the sealed fluid such as in the prior art is suppressed since the centering member for keeping the axis lines of the seal ring and the second annular member in alignment with each other is arranged in the non-sealed region. In other words, according to the present invention, the sealed fluid, which is a liquid body that has fluidity at high temperature but solidifies when the temperature lowers, such as tar and pitch does not enter the space between the centering member, and the seal ring and the second annular member and fix thereat. Therefore, the vibration due to the slidable movement of the first annular member and the seal ring is suppressed from being transmitted to the bellows, and the bellows is suppressed from being damaged.

The bellows type mechanical seal may include a baffle sleeve including a cylindrical portion, axially extending between an outer peripheral surface of the rotating shaft and the inner peripheral surfaces of the second annular member and the seal ring, for guiding a quench fluid to the inner peripheral side of the seal surface between the second annular member and the seal ring, the baffle sleeve being fixed to the housing.

Therefore, the space between the centering member, and the seal ring and the second annular member is cleaned with the quench fluid, so that the contacting state of the seal surfaces between the seal ring and the second annular member is maintained satisfactory.

The bellows type mechanical seal may include an elastic member for acting an elastic force on the second annular member in a radially outwardly direction.

Therefore, the vibration generated at the second annular member due to the slidable movement of the first annular member fixed to the rotating shaft and the seal ring is buffered by the elastic member, so that the vibration can be suppressed from being propagated to the bellows.

The bellows type mechanical seal may include the elastic member which is attached between an outer peripheral surface of the cylindrical portion of the baffle sleeve and an inner peripheral surface of the centering member, or between an outer peripheral surface of the cylindrical portion of the baffle sleeve and an inner peripheral surface of the second annular member.

The bellows type mechanical seal may include the elastic member which is a plate spring formed in an annular shape.

Thus, the configuration for suppressing the vibration of the bellows can be easily formed.

According to the present invention, the influence of vibration on the bellows can be reduced.

DETAILED DESCRIPTION OF THE INVENTION

The best modes for carrying out the invention will be hereinafter illustratively described in detail based on the examples with reference to the drawings. It should be recognized that the dimension, material, shape, relative arrangement and the like of the components described in the example are not intended to limit the scope of the invention unless specifically stated in particular.

FIRST EXAMPLE

Figure 1:
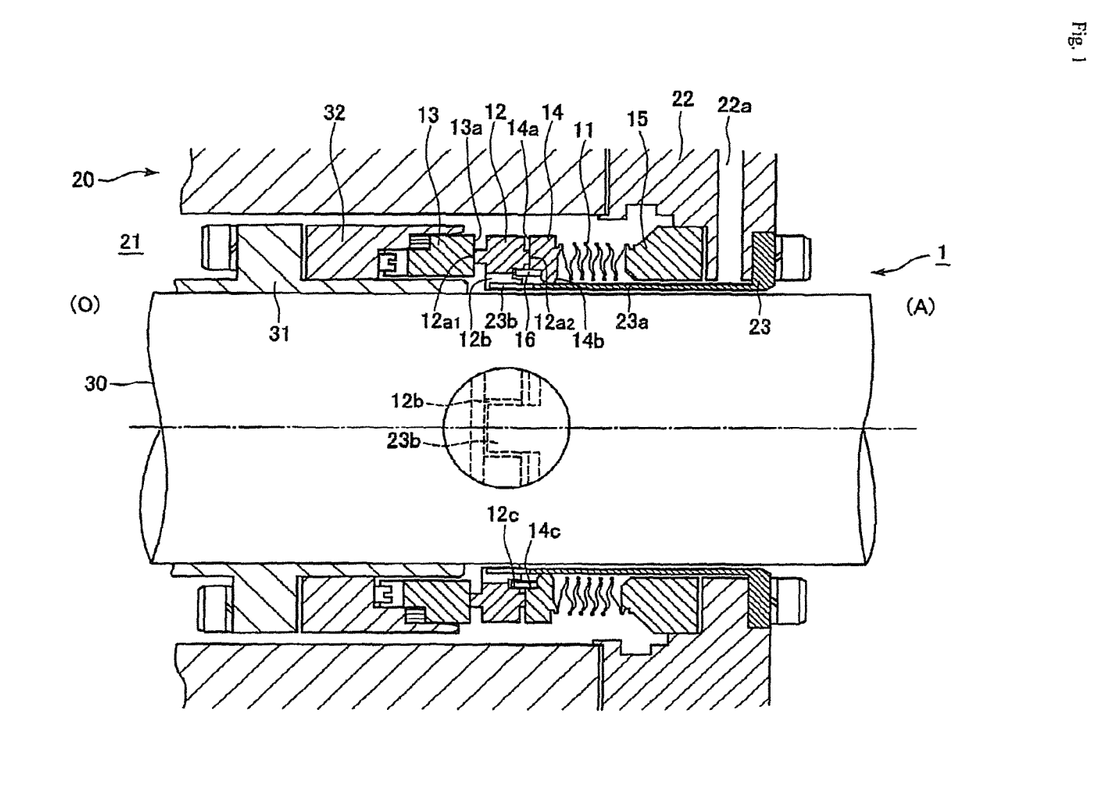
FIG. 1 is a schematic cross-sectional view describing the configuration of a bellows type mechanical seal according to a first example of the present invention.

A bellows type mechanical seal according to a first example of the present invention will be described with reference to FIG. 1. FIG. 1 is a schematic cross-sectional view describing the configuration of the bellows type mechanical seal according to the first example of the present invention.

The bellows type mechanical seal 1 according to the present example is used as shaft seal device of a pump that handles fluid of high temperature over 200° C. and containing great amount of solid content such as asphalt, tar, pitch, and the like in petroleum refinery, petrochemical plant, iron making chemical plant, and the like.

In outline, the bellows type mechanical seal 1 is configured such that a seal ring 12 sealably contacts a mat ing ring 13 fixed to a rotating shaft 30 and a retainer 14 resiliently supported by a housing 20 through a bellows 11, a collar 15, a seal cover 22 and the like to seal an annular space between a shaft hole 21 of the housing 20 and the rotating shaft 30. Thus, the sealed fluid such as tar and pitch is prevented from leaking from a sealed region (O), which is the inside of the device, to a non-sealed region (A), which is the atmosphere side.

The bellows type mechanical seal 1 also includes a baffle sleeve 23 for guiding a quench fluid such as steam for cleaning a seal surface of the seal ring 12 and the retainer 14. The baffle sleeve 23 includes a cylindrical portion 23a axially extending between the inner peripheral surface of the seal ring 12, the retainer 14, or the like and the outer peripheral surface of the rotating shaft 30. The baffle sleeve 23 is made from a metal material such as SUS 630.

The mating ring 13 serving as a first annular member is fixed to the sleeve 31 fixed on the outer peripheral surface of the rotating shaft 30 by a retainer 32 made of a metal material having low coefficient of thermal expansion of around $5 \times 10^{-6}$ 1° C. such as 42% Ni—Fe. The mating ring 13 has an end face 13a perpendicular to the shaft at the end on the opening side of the shaft hole 21.

The retainer 14 serving as a second annular member is an annular member made from a different type of material having a coefficient of thermal expansion substantially approximate to the metal such as inconel 625 and the material of the bellows 11, where one end of the bellows 11 is welded to the end on the opening side of the shaft hole 21.

The bellows 11 is an accordion-like member made of metal such as inconel 625. As shown in FIG. 1, the bellows 11 is configured by coupling the inner peripheral parts or the outer peripheral parts of a plurality of metal discs (metal diaphragm plates) formed to have a wave-like cross section to each other by welding and the like so as to become an accordion-like tube shape as a whole.

The bellows 11 shown in FIG. 1 merely shows one example of a specific configuration of the welded bellows, and the configuration of the bellows used in each example of the present invention is not limited to the configuration shown in FIG. 1. The illustration of a specific shape of the bellows 11 is omitted in FIG. 2, FIG. 5, FIG. 6, and FIG. 8.

The collar 15 is welded to the other end of the bellows 11. The collar 15 is an annular member made of metal such as SUS 304, and is fixed to the seal cover 22 attached to the opening of the shaft hole 21 of the housing 20.

The three members, the retainer 14, the bellows 11, and the collar 15 that are welded to each other can be assembled to the housing 20 (seal cover 22) as one unit (bellows assembly).

The retainer 14 has an end face 14a perpendicular to the axis at the end on the side opposite to the opening of the shaft hole 21. The retainer 14 includes a damper 14b configured by a projection that projects out in the radially inwardly direction at plural areas on the inner peripheral surface to partially narrow the space between the inner peripheral surface of the retainer 19 and the outer peripheral surface of the cylindrical portion 23a of the baffle sleeve 23. The specific configuration of the damper 14b is similar to the damper 104a of the mechanical seal 100 shown in FIG. 6 (see FIG. 7) and the damper 104a of the mechanical seal 100' shown in FIG. 8, and thus the detailed description will be omitted. The space between the retainer 14 and the cylindrical portion 23a of the baffle sleeve 23 forms an enlarged flow path in which the region enlarged between the adjacent projections easily guides the quench fluid supplied from a quench hole 22a of the seal cover 22 to the end sealing face side along the outer periphery of the cylindrical portion 23a of the baffle sleeve 23.

The seal ring 12 includes end sealing faces 12a1, 12a2 perpendicular to the axis on both sides in the axial direction. The end sealing face 12a1 (first end sealing face) on the side opposite to the opening (Device side) of the shaft hole 21 contacts the end face 13a of the mating ring 13, and the end sealing face 12a2 (second end sealing face) on the opening side of the shaft hole 21 contacts the end face 14a of the retainer 14. The face width of the end sealing face 12a2 that contacts the retainer 14 is set to be substantially the same or slightly narrower than the face width of the end sealing face 12a1 that contacts the mating ring 13.

The end face 13a of the mating ring 13 and the end face 14a of the retainer 14 are both lapping finished (surface polished), and have the surface roughness and the planarity same as the end sealing faces 12a1, 12a2 of the seal ring. The lapping surfaces sealably contact each other by the spring load of the bellows 11 and the pushing force by the fluid pressure.

One or a plurality of cutouts 12b is formed on the inner peripheral surface of the seal ring 12, so that the protrusion 23b arranged at the distal end of the cylindrical portion 23a of the baffle sleeve 23 interlocks (loosely engage) with the cutout 12b with a very small gap (see circled broken line part at the central part of FIG. 1). The seal ring 12 is configured to be freely movable in the axial direction but regulated in the movement in the peripheral direction, that is, the rotating movement by the clutch mechanism.

Therefore, the end sealing face 12a1 that contacts the end face 13a of the mating ring 13 contacts in a freely slidable manner by the rotation of the rotating shaft 30, but the end sealing face 12a2 that contacts the end face 14a of the retainer 14 becomes a substantially stationary sealed surface that does not generate slidable movement by rotation since the rotation of the seal ring 12 with respect to the retainer 14 is regulated.

A step 12c for enlarging the inner diameter on the retainer 14 side of the seal ring 12 is provided on the inner peripheral surface of the seal ring 12. A step 14c for enlarging the inner diameter on the seal ring 12 side of the retainer 14 is also provided on the inner peripheral surface of the retainer 14. The steps 12c, 14c have the inner diameter dimension set to be substantially the same, and an annular recess is formed at the boundary of the seal ring 12 and the retainer 14. A centering case 16 serving as a centering member for aligning the seal ring 12 and the retainer 14 is attached to the recess. The centering case 16 is an annular member manufactured with the material same as the seal ring 12 or the material (e.g., SiC) having a coefficient of thermal expansion same as or smaller than the seal ring 12, and is fitted with a very small gap in the radial direction with respect to the recess.

As described above, in the present example, the seal ring 12 is not fixed to the retainer 14 as in the conventional example, and is configured to be freely slidable in a direction perpendicular to the axis between the mating ring 13 and the retainer 14. Therefore, the dimensional change in the axial direction due to influence of thermal expansion and the like is absorbed by the expansion and contraction of the bellows 11, and the dimensional change in the direction (radial direction) perpendicular to the axis is absorbed when the end sealing faces perpendicular to the axis slidably move (shift) with respect to each other. The planarity of the end sealing face of the seal ring 12 that slidably contacts the mating ring 13 is thus not subjected to the influence of thermal expansion even in high temperature atmosphere, and sealability can be maintained. The planarity is also not influenced by pressure deformation and thermal deformation of the retainer 14 itself.

Furthermore, since the seal ring 12 is not fixed to the retainer 14, special steps such as burn fitting and press fitting, and the subsequent heat processing and the like as in the prior art are unnecessary, and the jigs involved therewith are also unnecessary. The cost thus can be reduced and the number of steps can be reduced. The seal ring replacement task is also facilitated.

In the present example, the centering case 16 for aligning the seal ring 12 and the retainer 14 is attached to the stepped portion provided on each inner peripheral surface that becomes the non-sealed region side in the seal ring 12 and the retainer 14. In other words, the centering case 16 fitted with a very small gap in view of the difference in the coefficient of thermal expansion has a configuration of not being in the sealed fluid, and hence the sealed fluid does not fix to the space between the centering case 16 and the seal ring 12 and the retainer 14 even if the sealed fluid is the fluid having the property of easily solidifying and fixing at low temperature or the fluid having great amount of solid content. Furthermore, the gap is cleaned with the quench fluid on a constant basis since the centering case 16 is arranged on the quench fluid side, and hence the lapped end faces of the seal portion may smoothly slip with each other on a constant basis.

SECOND EXAMPLE

Figure 2:
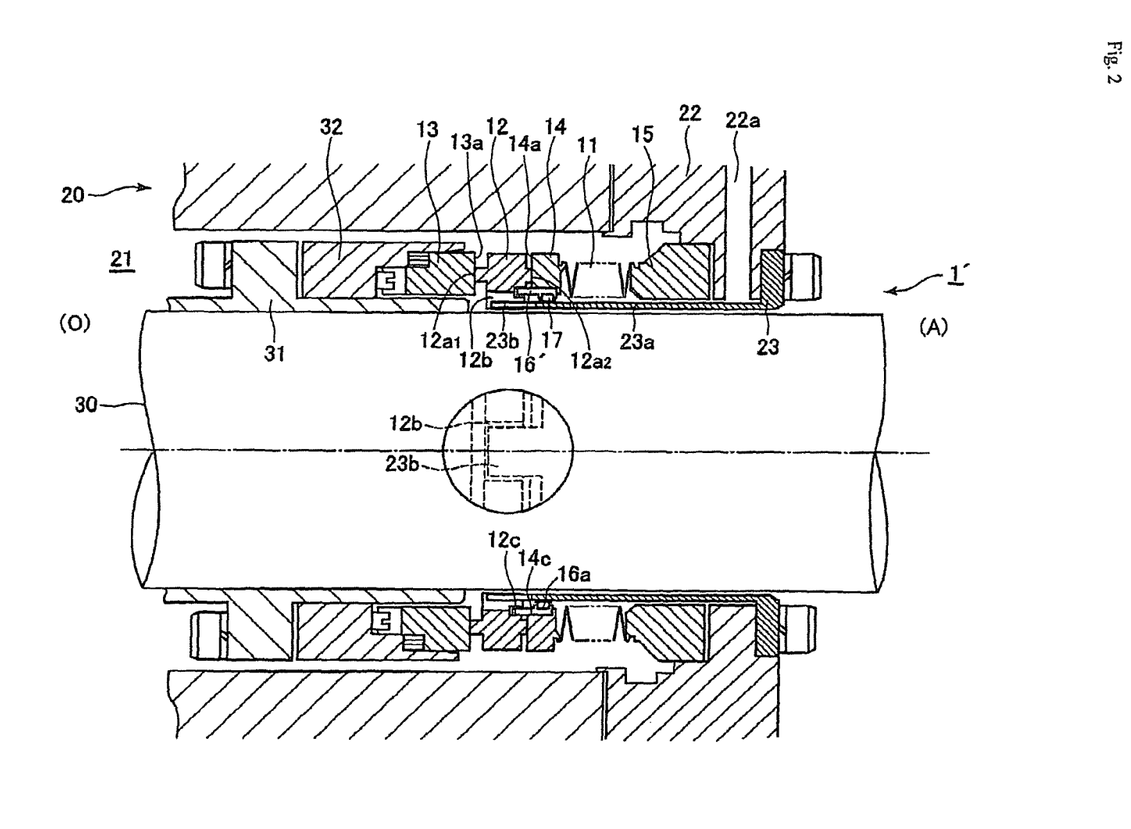
FIG. 2 is a schematic cross-sectional view describing the configuration of a bellows type mechanical seal according to a second example of the present invention.
Figure 3A:
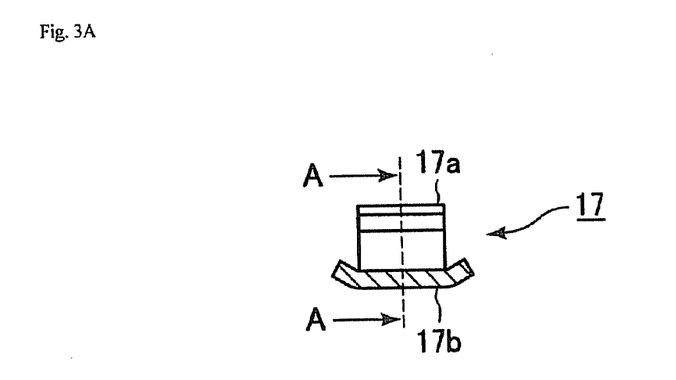
FIG. 3A is a schematic cross-sectional view of an elastic member.
Figure 3B:
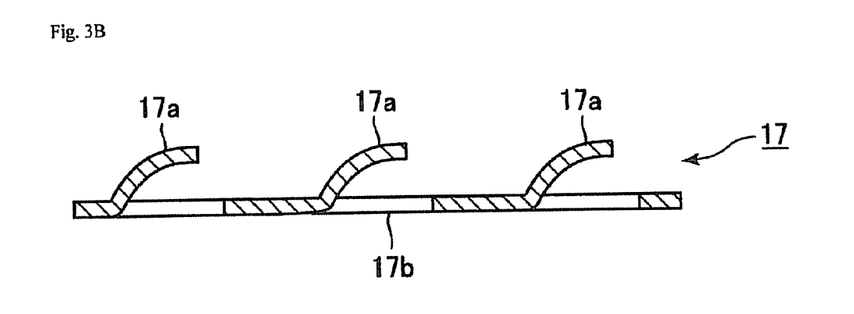
FIG. 3B is a cross-sectional view seen from arrow A of FIG. 3A.

A bellows type mechanical seal 1' according to a second example of the present invention will be described with reference to FIG. 2 to FIG. 3B. FIG. 2 is a schematic cross-sectional view describing the configuration of the bellows type mechanical seal 1' according to the second example of the present invention. FIG. 3A and FIG. 3B are schematic views describing the configuration of the elastic member, where FIG. 3A is a schematic cross-sectional view of an elastic member and FIG. 3B is a cross-sectional view seen from arrow A of FIG. 3A. The same reference numerals are attached to the configurations similar to the first example to omit the detailed description thereof, and only the portions different from the first example will be described. The configurations that are not described are the configurations similar to the first example.

The present example includes an elastic member 17 for acting an elastic force in a radially outwardly direction with respect to the retainer 14. The elastic member 17 is attached to an annular groove 16a provided on the inner peripheral side of the centering case 16', and is configured to elastically contact the cylindrical portion 23a of the baffle sleeve 23. The elastic member 17 is a very thin band member (annular plate spring member) having elasticity, where a great number of R-shaped projections 17a is arranged at equal interval on one surface. The elastic member 17 is annularly attached between the cylindrical portion 23a of the baffle sleeve 23 and the centering case 16', and the projection 17a is accommodated in the annular groove 16a on the inner periphery of the centering case 16' so that the axial movement is regulated.

The elastic member 17 has the plane portion (inner peripheral side) 17b contacting the outer periphery of the cylindrical portion 23a of the baffle sleeve 23 at a very low surface pressure by the elastic biasing force obtained when the projection 17a deforms in the radial direction, and buffers the vibration of the seal ring 12 and the retainer 14 through the centering case 16'. The plane portion (inner peripheral side) 17b of the elastic member 17 and the outer periphery of the cylindrical portion 23a of the baffle sleeve 23 can freely slidably move in the axial direction.

The dimension and configuration of each portion of the elastic member 17, the magnitude of the area pressure (elastic force) to act on the inner peripheral surface of the centering case 16' and the outer peripheral surface of the cylindrical portion 23a of the baffle sleeve 23, and the like are appropriately set so that the vibration generated by the slidable movement of the sealing 12 and the mating ring 13 can be sufficiently buffered by the deformation of the projection 17a and the plane portion 17b contacts at a low surface pressure of an extent of not inhibiting the free displacement (expansion and contraction of the bellows 11) in the axial direction of the seal ring 12 and retainer 14.

According to the present example, in the unlikely event that the joint portion of the lapped end sealing faces is fixed, the stick slip of the end sealing face may be propagated to the retainer 14 and vibrate, but the propagation of the vibration to the bellows 11 is suppressed since the vibration is buffered by the elastic member 17 and hence the breakage etc. of the welded portion of the bellows 11 is prevented.

The elastic member 17 is accommodated in the inner periphery of the centering case 16' and the centering case 16' is independent, and thus it can be easily fitted to the cylindrical portion 23a of the baffle sleeve 23 and the assembly is facilitated.

THIRD EXAMPLE

Figure 4:
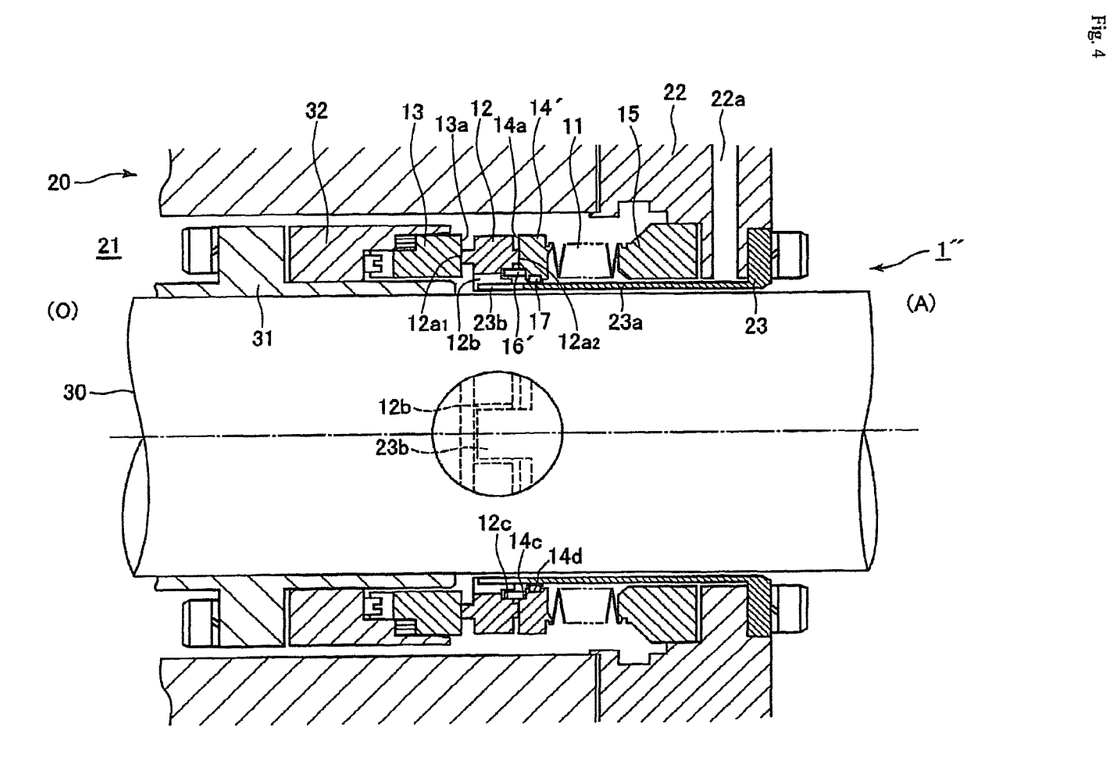
FIG. 4 is a schematic cross-sectional view describing the configuration of a bellows type mechanical seal according to a third example of the present invention.

A bellows type mechanical seal 1' according to a third example of the present invention will now be described with reference to FIG. 4. FIG. 4 is a schematic cross-sectional view describing the configuration of the bellows type mechanical seal 1" according to the third example of the present invention. The same reference numerals are attached to the configurations similar to the each example above to omit the detailed description thereof, and only the portions different from each example will be described. The configurations that are not described are the configurations similar to each example.

In the present example, an annular groove 14d is provided on the inner peripheral side of the retainer and the elastic member 17 is attached to the annular groove 14d. In other words, the vibration of the seal ring 12 and the retainer 14 is buffered through the centering case 16' in the second example, whereas the vibration of the retainer 14' is directly buffered by the elastic member 17 in the present example.

With the configuration of directly buffering the vibration of the retainer 14' without interposing another member, the change in buffering property caused by the dimensional change from thermal expansion and the like can be suppressed to a minimum.

Figure 5:
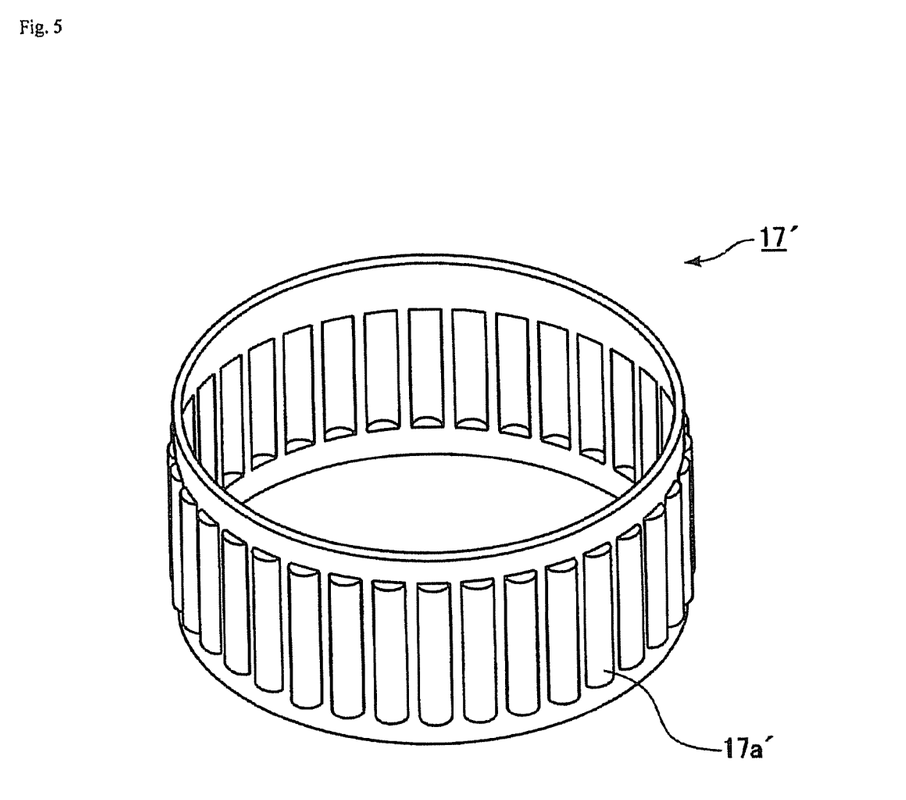
FIG. 5 is a schematic perspective view describing other configurations of the elastic member.

The configuration of the elastic member 17 according to the second example and the third example is not limited to the above described configuration, and any configuration may be appropriately adopted as long as the elastic force can be exerted in the radial direction. For instance, the elastic member 17' shown in FIG. 5 may be adopted. FIG. 5 is a schematic perspective view describing another configuration of the elastic member.

The elastic member 17' shown in FIG. 5 is configured by forming a plurality of projections 17a' through press molding on a thin band-shaped plate material made of stainless steel and the like, and curved to an annular shape. The elastic member 17 has a wave-like cross-sectional shape in the peripheral direction (cross-sectional shape seen from axial direction) by the plurality of projections 17a', where the vibration of the retainer and the like is buffered to suppress the propagation of the vibration to the bellows 11 when the plurality of projections 17a' elastically contacts the centering case 16' and the retainer 14'.

DESCRIPTION OF REFERENCE NUMERALS 1 bellows type mechanical seal
11 bellows
12 seal ring
13 mating ring
14 retainer
15 collar
20 housing
21 shaft hole
22 seal cover
23 baffle sleeve
30 rotating shaft

The invention claimed is:
1. A bellows type mechanical seal for sealing an annular space between a shaft hole formed in a housing and a rotating shaft inserted into the shaft hole, the bellows type mechanical seal comprising:

a first annular member fixed to the rotating shaft;

a second annular member resiliently supported with respect to the housing through a bellows at a position on an opening side of the shaft hole closer than the first annular member; and a seal ring having a first end sealing face contacting the first annular member in a freely slidable manner and a second end sealing face contacting the second annular member, both sealing faces being perpendicular to an axis line, wherein a centering member is arranged in an inner peripheral surface recess of the seal ring and an inner peripheral surface recess of the second annular member facing a non-sealed region in the annular space to keep axis lines of the seal ring and the second annular member in alignment with each other.

2. The bellows type mechanical seal according to claim 1, further comprising a baffle sleeve including a cylindrical portion, axially extending between an outer peripheral surface of the rotating shaft and inner peripheral surfaces of the second annular member and the seal ring, for guiding a quench fluid to the inner peripheral side of the seal surface between the second annular member and the seal ring, the baffle sleeve being fixed to the housing.

3. The bellows type mechanical seal according to claim 2, further comprising an elastic member for acting an elastic force on the second annular member in a radially outwardly direction.

4. The bellows type mechanical seal according to claim 3, wherein the elastic member is attached between an outer peripheral surface of the cylindrical portion of the baffle sleeve and an inner peripheral surface of the centering member.

5. The bellows type mechanical seal according to claim 3, wherein the elastic member is attached between an outer peripheral surface of the cylindrical portion of the baffle sleeve and an inner peripheral surface of the second annular member.

6. The bellows type mechanical seal according to claim 3, wherein the elastic member is a plate spring formed in an annular shape.

7. The bellows type mechanical seal according to claim 4, wherein the elastic member is a plate spring formed in an annular shape.

8. The bellows type mechanical seal according to claim 5, wherein the elastic member is a plate spring formed in an annular shape.

9. The bellows type mechanical seal according to claim 2, wherein the centering member is radially spaced outward from the baffle sleeve.

* * * * *